(12) United States Patent
Raes

(10) Patent No.: US 9,102,207 B2
(45) Date of Patent: Aug. 11, 2015

(54) DEVICE FOR AUTOMATICALLY ADJUSTING THE CAMBER ANGLE FOR A SUSPENSION SYSTEM

(71) Applicant: Michel Raes, Mouans Sartoux (FR)

(72) Inventor: Michel Raes, Mouans Sartoux (FR)

( * ) Notice: Subject to any disclaimer, the term of this patent is extended or adjusted under 35 U.S.C. 154(b) by 0 days.

(21) Appl. No.: 14/551,934

(22) Filed: Nov. 24, 2014

(65) Prior Publication Data

US 2015/0145221 A1    May 28, 2015

(30) Foreign Application Priority Data

Nov. 22, 2013   (FR) ..................................... 13 61497

(51) Int. Cl.
*B60G 3/26*    (2006.01)
(52) U.S. Cl.
CPC .............. *B60G 3/26* (2013.01); *B60G 2200/44* (2013.01); *B60G 2200/46* (2013.01)
(58) Field of Classification Search
USPC ............ 280/5.51, 5.52, 5.521, 86.75, 86.751, 280/86.752
See application file for complete search history.

(56) References Cited

U.S. PATENT DOCUMENTS

| 3,999,779 | A | * | 12/1976 | Bishop | ...................... | 280/5.521 |
| 4,213,631 | A | * | 7/1980 | Wilkerson | ................ | 280/86.752 |
| 4,487,429 | A | * | 12/1984 | Ruggles | ..................... | 280/5.521 |
| 4,796,720 | A | * | 1/1989 | Bauer | ........................... | 180/234 |
| 4,971,348 | A | | 11/1990 | Oyama et al. | | |
| 5,094,472 | A | | 3/1992 | Oyama et al. | | |
| 5,967,536 | A | * | 10/1999 | Spivey et al. | .......... | 280/124.141 |
| 6,302,416 | B1 | * | 10/2001 | Schmack | ................. | 280/93.512 |
| 2009/0256321 | A1 | * | 10/2009 | Suzuki et al. | ............... | 280/5.521 |
| 2012/0126498 | A1 | * | 5/2012 | Michel et al. | ................ | 280/5.52 |
| 2014/0091538 | A1 | * | 4/2014 | Matsuda et al. | ........... | 280/5.521 |
| 2015/0054244 | A1 | * | 2/2015 | Seo et al. | .................. | 280/86.752 |

FOREIGN PATENT DOCUMENTS

| DE | 2645060 | 4/1978 |
| EP | 0246116 | 11/1987 |
| FR | 2608973 | 7/1988 |
| FR | 2760421 | 9/1998 |

* cited by examiner

*Primary Examiner* — Toan To
(74) *Attorney, Agent, or Firm* — The Farrell Law Firm, P.C.

(57) ABSTRACT

Disclosed is a device for automatically adjusting a camber angle for a suspension system that includes a shock absorber. The device includes a first member rotationally drivable by a driving element during a displacement of a change of direction of the wheel, and a second member fixable to a vehicle frame. The first and second members cooperate to cause a relative translation of the first member and of the second member during a rotation of the shock absorber.

19 Claims, 4 Drawing Sheets

DEVICE FOR AUTOMATICALLY ADJUSTING THE CAMBER ANGLE FOR A SUSPENSION SYSTEM

PRIORITY

This application claims priority under 35 U.S.C. §119(a) to French Patent Application Serial No. 13/61497, which was filed on Nov. 22, 2013, the entire content of which is incorporated herein by reference.

BACKGROUND

1. Field of the Invention

The present invention generally relates to a device for automatically adjusting a camber angle, and relates to a suspension system and a motor vehicle provided with at least the system referred to.

2. Description of the Related Art

The most common current technique consists of permanently fixing a camber angle. Such angle is then selected as a compromise between an optimal value on a straight line (close or equal to 0° relative to the vertical) and an optimal value in a curve (where the angle is not null in order to increase the plane of the tread of the wheel tire considered on the road). The road behaviour has been affected by this search for a compromise. Besides, the fact that the camber angle is not adjusted in every rolling situation causes an early wearing of tire tread.

In order to remedy such drawback, systems for automatically adjusting the camber angle have been proposed. The publication FR-A1-2 760 421 thus discloses a simplified device for adjusting the camber angle of a wheel. The proposed technique focuses on the part of the suspension close to the wheel, specifically the cinematic connection of the steering knuckle of the wheel and a shock absorber wishbone so that, through a gear train, a rotation of the steering knuckle caused by the rotation of the steering wheel results in the pivoting, according to the camber angle of the wheel relative to the wishbone. Such technique is however very difficult to implement, more particularly because of the members concerned and the place of implementation thereof The invention makes it possible to remedy all or part of the drawbacks of the currently available techniques.

The invention may be applied to optimize the road behaviour of a vehicle, more particularly when driving in curves, through an appropriate modification of the camber angle.

SUMMARY

The present invention has been made to at least partially solve, reduce, or remove at least one of the problems and/or disadvantages described above, and to provide at least the advantages described below.

Accordingly, an aspect of the present invention is to provide a a device for automatically adjusting the camber angle for a suspension system provided with a shock absorber and intended for a wheel of a motor vehicle.

Advantageously, such device includes a first member configured to be rotationally drivable by a driving element during the displacement of a change of direction of the wheel, and a second member configured to be fixed to the vehicle frame, with the first member and the second member cooperating so as to cause a relative translation of the first member and of the second member during a rotation of the shock absorber.

The invention thus operates by taking advantage of the rotational displacement of a driving element, because the latter is caused to rotate by the pivoting of the steering wheel. The transformation of the displacement, causing the change in the camber angle, can thus be obtained more simply through a fixed part integral with the frame and a movable part rotating together with the steering system.

In accordance with another aspect of the present invention, a suspension system is provided with a shock absorber and intended for a wheel of a motor vehicle, comprising a device as described above.

The invention also relates to a motor vehicle that includes this system.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 2:
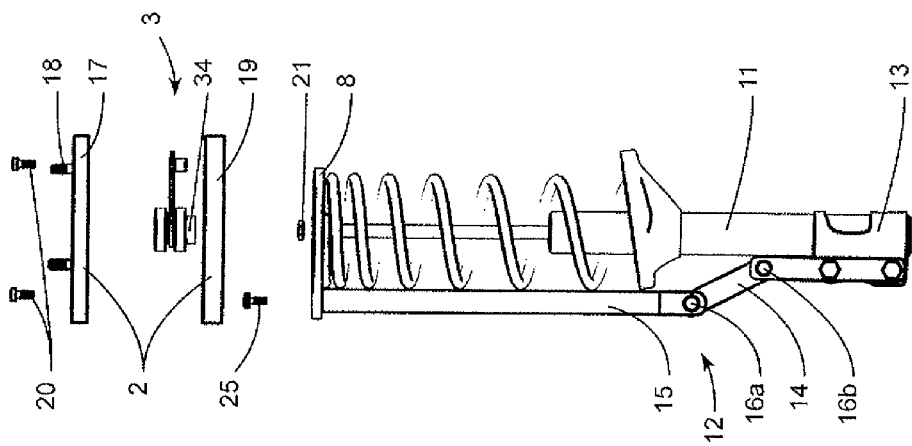
FIG. 2 is an exploded side view of the embodiment of FIG. 1.

The present invention may have various modifications and various embodiments, among which specific embodiments will now be described more fully with reference to the accompanying drawings. However, it should be understood that there is no intent to limit the present invention to the specific embodiments, but on the contrary, the present invention covers all modifications, equivalents, and alternatives falling within the scope of the invention.

Terms including ordinal numerals such as "first", "second", and the like can be used to describe various structural elements, but the structural elements are not limited by these terms. The terms are used only to distinguish one structural element from another structural element. For example, without departing from the scope of the present invention, a first structural element may be referred to as a second structural. Similarly, the second structural element also may be referred to as the first structural element. The terms "and/or" includes combinations of a plurality of related items or a certain item among the plurality of related items.

The terms used in this application are for the purpose of describing particular embodiments only and is not intended to limit the invention. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existence or probability of addition of one or more other features, numerals, steps, operations, structural elements, parts, or combinations thereof.

Unless defined differently, all terms used herein, which include technical terminologies or scientific terminologies, have the same meaning as a person skilled in the art to which the present invention belongs. Such terms as those defined in a generally used dictionary are to be interpreted to have meanings equal to the contextual meanings in the relevant field of art, and are not to be interpreted to have ideal or excessively formal meanings unless clearly defined in the present specification.

Before going into the detailed description of one embodiment of the invention, specifically while referring to the illustrated cases, possible options which the invention may provide, alone or in any combination thereof, are as follows:
- one of the first member 3 and the second member 2 includes a finger 31, wherein the other one of the first member 3 and the second member 2 includes a guiding track 22 of the finger 31, with the guiding track 22 and the finger 31 causing the relative translation;
- the guiding track 22 is a groove in a base part;
- the base part 19 includes an oblong hole 23 for angular displacement during the relative translation;
- the member which includes the finger 31 has a shaft 29 going through the oblong hole and a lever arm 30 coupling the shaft 29 and the finger 31;
- the member which includes the finger 31 with at least a bearing between the shaft 29 and the wall of the oblong hole;
- the member of the first member 3 and the second member 2 which includes the guiding track of the finger is the second member;
- the first member 3 includes a connector on an upper zone of the shock absorber 4;
- the second member 2 includes a plate 17 which can be fixed on the frame;
- the plate 17 includes a secondary oblong hole 26 which the shaft 29 goes through;
- the first member 3 includes at least a bearing between the shaft 29 and the wall of the secondary oblong hole 26;
- the device includes a stiffening system 12 provided with a first section which can be fixed on a part of a strut 11 of the shock absorber 4 and a second section rotating together with the first member 3;
- said stiffening system 12 includes a deformable intermediate section configured to accommodate variations in length in compression and in expansion of the shock absorber 4;
- the device includes a mount which can be fixed at the upper end of the shock absorber 4 and whereon the first member 3 is fixed;
- the second section of the stiffening system is fixed on the mount; and
- the shock absorber is of the pseudo Mac Pherson type.

The case shown in the Figures is particularly adapted to the equipment of the two front drive wheels of a motor vehicle with, preferably for each wheel, a suspension with a shock absorber of the pseudo Mac Pherson type.

Such example is not restrictive. More particularly, other types of shock absorbers exist, for which a pivot coupling between the second member and a member rotating with or so configured as to follow the rotation of the steering column.

Thus, the invention includes a driving element such as a shaft which follows the rotational displacement of the steering wheel. 'Follows the displacement' means that, using any displacement transmission technique, the driving element adopts its own rotation or another mobility during a rotation of the steering wheel, with possibly a reduction ratio. A case of application of the invention apart from the pseudo-Mac Pherson shock absorber is the case of a double wishbone suspension. In such a case, a member of the invention is fixed to the frame and the second one is coupled, by a driving element such as a shaft, to the steering column.

The implementation remains simple since it requires little adaptation, more particularly because it is fixed to the frame, and does not affect the suspension or the wheel.

Figure 1:
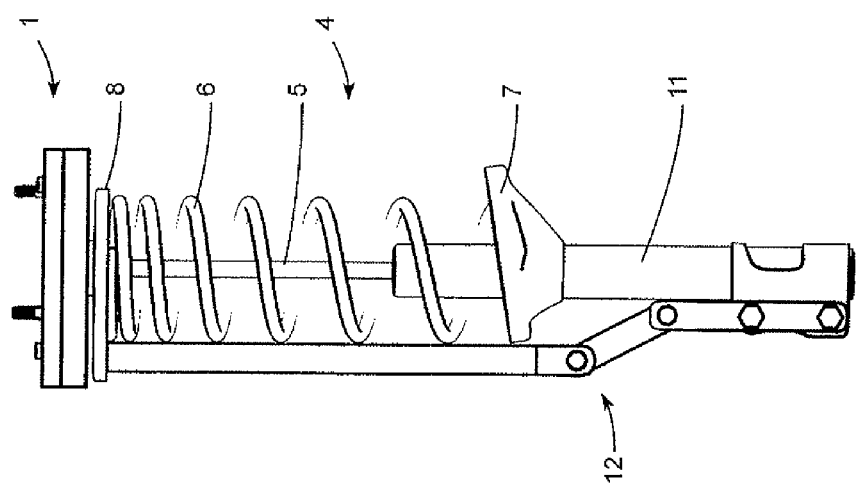
FIG. 1 shows an assembled side view of a device according to the invention, in a neutral position.

In FIG. 1 for example, such a pseudo-Mac Pherson shock absorber 4 is shown with a strut 11, which may be fixed to the steering knuckle used for steering the wheel. The junction between the non suspended masses among which the wheel and the suspended masses among which the frame is provided by a jack of a shock absorber, the rod of which bears reference 5 and by a coil spring 6. In the example, the base of the spring is received in a mount 7. The top of the shock absorber comprises an upper mount 8 capping the coil spring 6. Such upper mount 8 and the tip of the rod 5 form the part configured to be coupled to the frame.

In such a context, the invention makes it possible to provide, as original equipment or as a kit, a device ensuring the automatic variation of the camber angle 33. It should be reminded that the camber angle 33 refers, in the front view of the wheel, to the angle formed by the center line of the tread of the wheel relative to the vertical.

In the case shown, the device 1 used for modifying the camber angle is mainly shown in the upper part of the suspension system as a housing, an upper face of which can be fixed to the vehicle frame, for example using the fixing elements 18 shown in FIG. 2.

Figure 4:
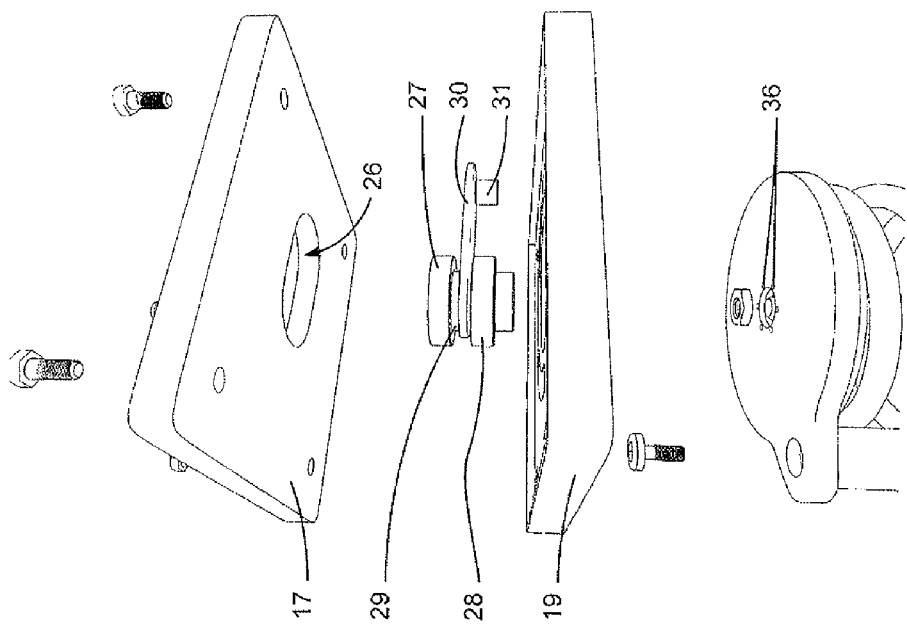
FIG. 4 is a view showing some components of the invention in greater detail.
Figure 3:
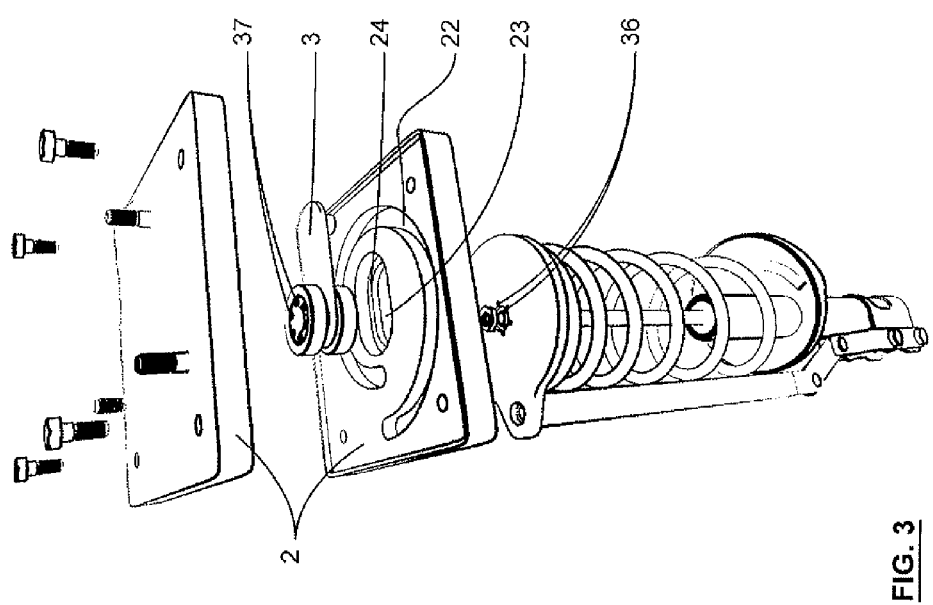
FIG. 3 is a perspective illustration of FIG. 2.

In FIG. 2, components of the device 1 are shown in an exploded view, mainly showing a first member 3 and a second member 2. In the illustrated example, the second member 2 is fixed on the frame and the first member 3 is connected with the shock absorber 4. The second member 2 comprises here a base 19 and a plate 17 which can be assembled for example using the screw 20. These two parts define a reception volume for the first member 3. The first and second members 2, 3 are so configured that a rotation imparted on the first member 3 causes a relative displacement of the two members 2, 3, according to the camber angle. FIGS. 2 through 4 show an exemplary cooperation between the members 2, 3 therefor.

The first member 3 is first coupled with the shock absorber 4, advantageously using a plurality of screws going through the holes 37 through the first member 3 and cooperating with the holes 36 in the upper mount 8, like in FIG. 3. The first member 3 can thus follow the rotation of the shock absorber 4 proper. The first member 3 is preferably provided with a shaft 29 oriented along the longitudinal axis of the shock absorber 4 and at which the member 3 is fixed on the shock absorber 4.

The invention preferably comprises at least one screw which goes through the shaft 29 through a hole 37. Such at least one screw is preferably threaded and advantageously cooperates with a threaded hole 36 to be coupled with the screw. A plurality of screws, of holes 37 and of holes 36 are preferably distributed on the circumference of the shaft 29 in order to couple the latter with the mount 8.

Besides, it is provided with a lever arm 30 spacing the shaft 29 and the finger 31 but coupling these together. It should be understood that the rotation of the shaft 29 via the lever arm 30 causes an angular displacement of the finger 31 to cause a rotational displacement.

The shaft 29 protrudes through the oblong hole 29 with a sufficient length to be supported by the mount 8 while avoiding a contact between the mount 8 and the base 19, with the shaft 29 being used as a spacer.

The first member 3 is received in the second member 2, on the base 19 thereof The latter comprises, in the example of FIG. 3, an oblong hole 23 for the angular displacement of the first member 3 in a reversible translation displacement. Such angular displacement and thus the longitudinal axis of the hole 23 are advantageously oriented in the direction of a camber angle. The second member 2 also comprises a guiding track 22 for the displacement of the finger 31. The dimensions and shapes of the track 22 and of the finger 31 are so adjusted as to enable the cooperation thereof through the peripheral walls thereof. Besides, the finger 31 may comprise a bearing to provide frictionless rolling in the track 22.

The track 22 has a curvilinear profile around the axis of the shaft 29 and preferably travels on 360°. However, such curvilinear profile is not circular so that the displacement of the finger 31 in the track 22 causes a displacement of the shaft 29 in the oblong hole 23.

In the Figure, the track 22 includes a first end for which the distance of the track 22 to the edge of the oblong hole 23 is minimum and a last end, offset by 360° relative to the first one, for which such distance is maximum. An intermediate angular position, advantageously in the middle, between the two ends preferably corresponds to a neutral position of the device wherein the wheels are straight, to drive in a straight line, and wherein the camber angle 33 is minimum (for example null).

As explained above, as the base 19 and, thus, the track 22 are fixed to the frame of the vehicle, a rotation of the steering wheel and an induced rotation of the shock absorber 4 will cause a rotation of the finger 31 in the track 22 and an angular displacement of the first member 3 in the oblong hole 23. In order to facilitate the displacement, the first member 3 advantageously includes a bearing 28 applied to the wall of the oblong hole 23 and possibly also supported by a shoulder 24 at the lower end of the oblong hole 23, with the end 34 of the shaft 29 going through the hole 23 toward the upper mount 8.

A similar provision is preferably implemented with a bearing 27 between the shaft 29 and an oblong hole 26 in the plate 17. The guiding of the first member 3 is thus balanced between the two parts 17 and 19. The oblong hole 26 is not necessarily a through hole. It is preferably similar to the hole 23 as regards its profile and its dimensions, with an example shown in FIG. 4.

The principle of the invention takes advantage of the moment of a force which may be exerted by the shock absorber to apply, via the finger 31 and the track 22, an angular displacement of the first member 3 into the second member 2 and cause a displacement according to the camber angle. Such mechanical stress induces a torsional stress of the shock absorber 4. In order to increase the resistance of the latter, the invention may provide a stiffening system 12 configured to increase the torsional resistance between the base and the head of the shock absorber 4. In the example (more particularly referring to FIG. 2), such system 12 includes a coupler 13 providing attachment on the strut 11. The other end of the system 12 is fixed, for example by a nut 21. Between such attachments, an assembly stiff in torsion extends along the shock absorber 4. It may include an arm 15 articulated in 16a on a link 14, which is also articulated in 16b on the coupler 13. Such articulated system makes it possible to accommodate the variations in length of the suspension, during the phases of compression and expansion.

Figure 6:
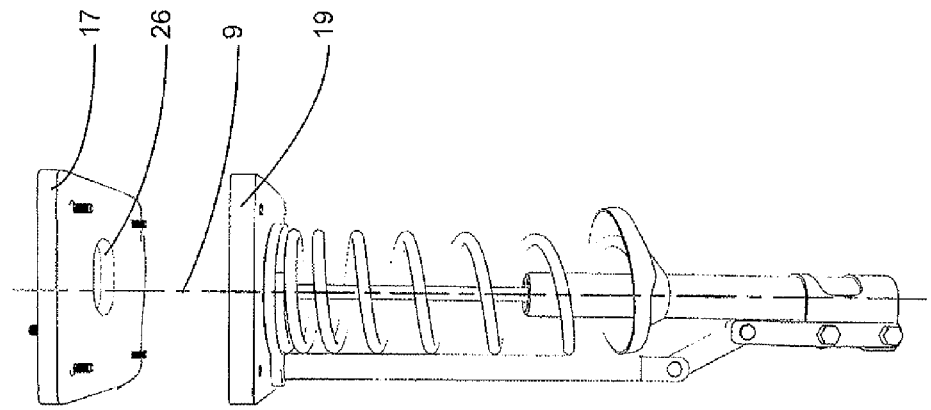
FIGS. 5 and 6 illustrate a situation wherein the device is shown in a neutral position.
Figure 5:
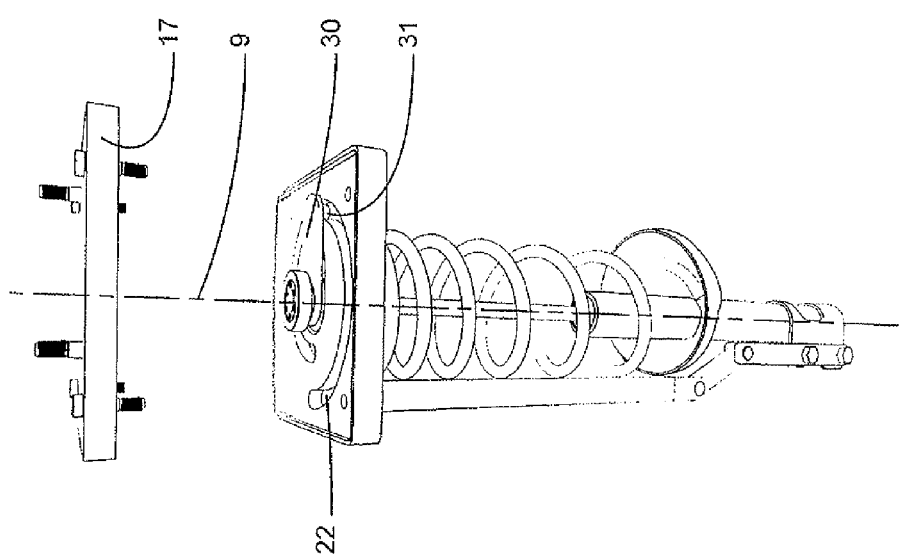
Figure 8:
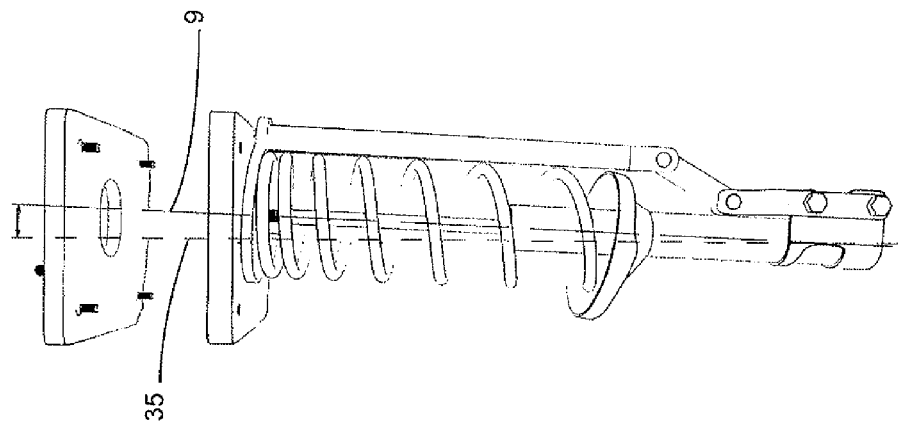
FIGS. 7 and 8 show a situation after the rotation of the steering wheel according to a given angle having caused the displacement of rotation of the shock absorber, with an amplitude of 180°, rotated in a reverse clockwise direction.
Figure 7:
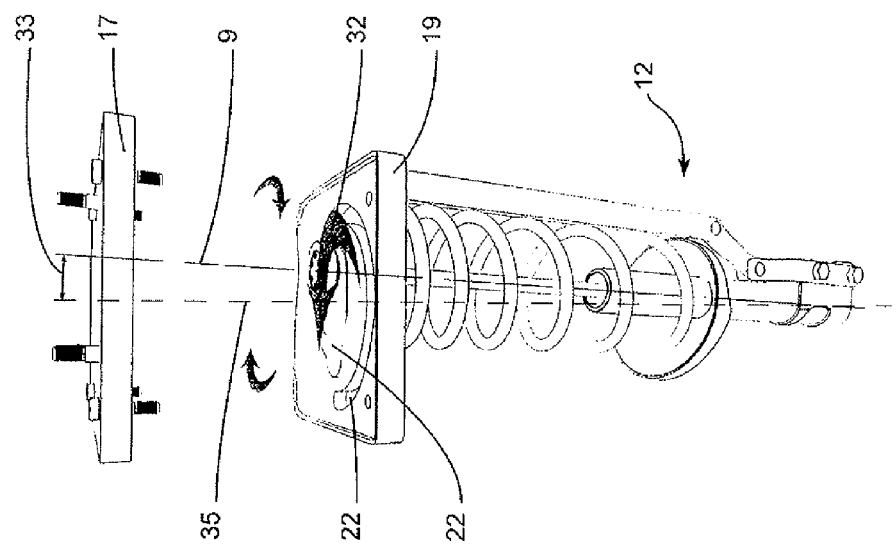

An illustration of the operation of the invention is shown in two different positions, respectively in FIGS. 5 and 6, and in FIGS. 7 and 8.

In FIGS. 5 and 6, the device is in the neutral position, with the finger 31 being in the middle of its potential travel in the guiding track 22. The shaft 9 of the shock absorber 4 is in a central position, here such that the camber angle is null, with the shaft 9 being oriented in a vertical reference direction. The wheel, coupled to the strut 11 takes the same direction.

In FIGS. 7 and 8, the shock absorber 4 has rotated by 180° around its shaft 9, due to the rotation of the steering wheel of the vehicle. Such rotation is shown in FIG. 7, and causes a 180° displacement of the finger 31 in the track so that the finger 31 reaches one end of the track 22. This causes the finger to push in the longitudinal direction of the oblong hole 23 (and of the hole 26 as the case may be), so that a relative translation of the shaft 29 and of the second member 2 occurs. Such angular displacement oriented in the direction of a camber angle, results in a modification of the camber angle revealed by the mark 33 between the shaft 9 and the now different reference direction 35.

Thanks to the gear reduction, the maximum camber angle can be reached after a rotation of the steering wheel according to a predetermined angle. The angle variation, for a given wheel, may be positive or negative depending on the direction of rotation of the steering wheel.

Although embodiments are described in the above description of the present invention, various modifications can be made without departing from the scope of the present invention. Accordingly, the scope of the present invention shall not be determined by the above-described embodiments, and is to be determined by the following claims and their equivalents.

What is claimed is:

1. A device for automatically adjusting a camber angle of a suspension system comprising a shock absorber configured for use with a wheel of a vehicle, the device comprising:
   a first member rotationally drivable by a driving element during a displacement of a change of direction of the wheel; and
   a second member configured to be fixed to a frame of the vehicle,
   wherein the first member and the second member are configured to cooperate to provide a relative translation of the first member and of the second member during a rotation of the shock absorber.

2. The device of claim 1, further comprising a finger fixedly attached to one of the first member and the second member, wherein the other one of the first member and the second member comprises a guiding track of the finger, with the guiding track and the finger are configured to provide the relative translation.

3. The device of claim 2, wherein the guiding track is configured as a groove in a base part.

4. The device of claim 3, wherein the base part includes an oblong hole for the angular displacement during the relative translation.

5. The device of claim 4, wherein one of the first member and the second member which comprises the finger includes a shaft extending through the oblong hole and a lever arm configured to couple the shaft and the finger.

6. The device of claim 5, wherein one of the first member and the second member which comprises the finger includes at least a bearing positioned between the shaft and a wall of the oblong hole.

7. The device of claim 2, wherein the second member comprises the guiding track of the finger.

8. The device of claim 1, wherein the second member comprises a plate configured to attach to the frame of the vehicle.

9. The device of claim 5 wherein the second member comprises a plate configured to be fixed on the vehicle frame, and wherein the plate comprises a secondary oblong hole through which the shaft extends.

10. The device of claim 9, wherein the first member comprises at least one bearing positioned between the shaft and a wall of the secondary oblong hole.

11. The device of claim 1, wherein the shock absorber is the driving element and the first member is rotationally driven by rotation of the shock absorber around a vertical axis thereof.

12. The device of claim 11, wherein the first member comprises a connector configured to rotatable connect the shock absorber to the vehicle.

13. The device of claim 11, comprising a stiffening system provided with a first section configured to attach to the shock absorber, and a second section configured to rotate together with the first member.

14. The device of claim 13, wherein the stiffening system comprises a deformable intermediate section configured to accommodate variations in length during compression and expansion of the shock absorber.

15. The device of claim 11, further comprising a mount configured to be fixed at an upper end of the shock absorber, where the first member is fixed.

16. The device of claim 13, wherein the first member is configured to be rotationally driven by the rotation of the shock absorber, further comprising a mount configured to be fixed at the upper end of the shock absorber where the first member is fixed, and wherein the second section of the stiffening system is fixed to the mount.

17. A suspension system provided with a shock absorber configured for use with a wheel of the vehicle, the suspension system comprising a device according to claim 1.

18. The suspension system of claim 17, wherein the shock absorber is a pseudo MacPherson type shock absorber.

19. A motor vehicle comprising at least a system according to claim 17.

* * * * *